United States Patent
Cho et al.

(10) Patent No.: US 10,727,466 B2
(45) Date of Patent: Jul. 28, 2020

(54) POLYETHYLENEIMINE-ATTACHED CARBONACEOUS MATERIAL AND SEPARATOR FOR LITHIUM-SULFUR BATTERY COATED WITH THE SAME

(71) Applicant: KOREA INSTITUTE OF SCIENCE AND TECHNOLOGY, Seoul (KR)

(72) Inventors: Won Il Cho, Seoul (KR); Mun Sek Kim, Seoul (KR); In Wook Nah, Seoul (KR); Young Rok Lim, Seoul (KR); Sun Min Park, Seoul (KR); In Hwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 71 days.

(21) Appl. No.: 15/846,819

(22) Filed: Dec. 19, 2017

(65) Prior Publication Data
US 2018/0269453 A1 Sep. 20, 2018

(30) Foreign Application Priority Data
Mar. 15, 2017 (KR) ........................ 10-2017-0032500

(51) Int. Cl.
| | | |
|---|---|---|
| H01M 2/16 | (2006.01) | |
| C08G 73/02 | (2006.01) | |
| H01M 2/14 | (2006.01) | |
| H01M 10/054 | (2010.01) | |
| H01M 12/06 | (2006.01) | |
| C09D 179/02 | (2006.01) | |
| C09D 5/24 | (2006.01) | |
| H01M 10/0525 | (2010.01) | |
| C09D 5/44 | (2006.01) | |
| C09D 7/65 | (2018.01) | |

(52) U.S. Cl.
CPC ...... *H01M 2/1686* (2013.01); *C08G 73/0206* (2013.01); *C09D 5/24* (2013.01); *C09D 5/44* (2013.01); *C09D 7/65* (2018.01); *C09D 179/02* (2013.01); *H01M 2/145* (2013.01); *H01M 2/1613* (2013.01); *H01M 2/1646* (2013.01); *H01M 2/1653* (2013.01); *H01M 10/054* (2013.01); *H01M 10/0525* (2013.01); *H01M 12/06* (2013.01); *H01M 2220/30* (2013.01); *Y02E 60/128* (2013.01)

(58) Field of Classification Search
CPC .......... H01M 2/1686; H01M 10/0525; H01M 12/06; H01M 10/054; H01M 2/145; H01M 2/1613; H01M 2/1653; H01M 2/1646; H01M 2220/30; C09D 5/44; C09D 7/65; C09D 179/02; C09D 5/24; C08G 73/0206; Y02E 60/128
See application file for complete search history.

(56) References Cited

U.S. PATENT DOCUMENTS

| | | | |
|---|---|---|---|
| 2012/0024153 A1* | 2/2012 | Barron | B01D 53/025 95/139 |
| 2015/0084604 A1 | 3/2015 | Thillaiyan et al. | |
| 2016/0211524 A1* | 7/2016 | Hao | H01M 4/131 |
| 2017/0141397 A1* | 5/2017 | Lecuyer | H01M 2/1653 |
| 2017/0229743 A1* | 8/2017 | Ito | H01M 2/1646 |
| 2018/0219215 A1* | 8/2018 | Bucur | H01M 4/362 |
| 2018/0287121 A1* | 10/2018 | Kim | H01M 2/1613 |

FOREIGN PATENT DOCUMENTS

| | | |
|---|---|---|
| KR | 10-2015-0045361 A | 4/2015 |
| KR | 10-2015-0078434 A | 7/2015 |

OTHER PUBLICATIONS

Lin Ma et al, "Enhanced Li—S Batteries Using Amine-Functionalized Carbon Nanotubes in the Cathode", ACS Nano, 2016, pp. 1050-1059, vol. 10.

* cited by examiner

*Primary Examiner* — Muhammad S Siddiquee
(74) *Attorney, Agent, or Firm* — Rabin & Berdo, P.C.

(57) ABSTRACT

In a secondary battery including a separator, the improvement includes a coating layer that is disposed on the separator and that comprises a polyethyleneimine-attached carbonaceous material The secondary battery may include an adhesive buffer layer provided between the separator and the coating layer which imparts adhesion force between the separator and the coating layer. The carbonaceous material adsorbs lithium polysulfides (LiPS) in use to inhibit a shuttling reaction between the anode and the cathode, caused by the dissolution of lithium polysulfides in the electrolyte, and increases recyclability of the lithium polysulfides, resulting in improvement of life characteristics and rate characteristics of the secondary battery.

16 Claims, 11 Drawing Sheets

POLYETHYLENEIMINE-ATTACHED CARBONACEOUS MATERIAL AND SEPARATOR FOR LITHIUM-SULFUR BATTERY COATED WITH THE SAME

CROSS-REFERENCE TO RELATED APPLICATIONS

This application claims priority under 35 U.S.C. § 119 to Korean Patent Application No. 10-2017-0032500 filed on Mar. 15, 2017 in the Korean Intellectual Property Office, the disclosure of which is incorporated herein by reference in its entirety.

TECHNICAL FIELD

The following disclosure relates to a polyethyleneimine-attached carbonaceous material and a separator for a lithium-sulfur battery coated with the same. More particularly, the following disclosure relates to a polyethyleneimine-attached carbonaceous material capable of adsorbing and reutilizing lithium polysulfides (LiPS), a separator for a lithium-sulfur battery coated with the same, and a lithium-sulfur battery including the separator.

BACKGROUND

The concept of a lithium ion battery (LiB) was set in 1962. Right after that, a lithium ion battery (LiB) was suggested by M. S. Whittingham of Exxon Company, leading to the invention of Li—TiS$_2$ batteries. However, commercialization of a battery system using lithium metal and Li—TiS$_2$ as an anode and cathode, respectively, was failed. This is because the anode of lithium metal (LiM) has poor safety and air/water sensitive Li—TiS$_2$ requires high production cost.

Then, the above-mentioned problem was solved by using graphite capable of reversible lithium intercalation/deintercalation and anodic oxide (developed by J. O. Bosenhard) as an anode and cathode, respectively. Therefore, the currently available LiB was successful in commercialization. In 1991, the first commercialized product of LiB was launched by Sony and Asahi Chemicals and brought a progressive chance for leading successful spread of the market of portable electronic instruments. Then, LiB has been used widely and explosively. Particularly, LiB has satisfied a need for electric energy directly related with continuous innovation of general electric devices, such as cellular phones, music players, speakers, drones, vehicles and microsensors. Many researchers and scientists have studied and investigated novel and advanced energy materials, chemistry and physics about the fixed/mobile energy storage systems satisfying an increasing need for energy.

Since the development of commercialized LiB technology reaches a saturated state recently so that gradual improvement of the electrochemical performance of LiB may be reported merely, research and development of a novel energy material having a different shape and composition is required essentially in order to meet the energy requirement. Therefore, secondary batteries having high energy density, such as lithium-sulfur batteries and lithium-air batteries including a LiM anode and a conversion based cathode, have been given many attentions as next-generation batteries.

The cathode based on sulfur and carbon theoretically has an energy density of about 2,600 Wh/kg and about 11,400 Wh/kg, respectively. Thus, it shows an energy density approximately 7 times higher than the energy density (about 360 Wh/kg, C/Co$_2$O$_4$) of LiB. One of the anode materials, LiM, has a high theoretical energy density of about 3,560 Wh/kg as well as a significantly low redox potential (−3.04V Vs. S.H.E.) and a density of 0.59 g/cm$^3$. On the contrary, a graphite anode material has a theoretical energy density of about 372 mAh/g and a slightly high redox potential and density. Therefore, when a graphite anode is substituted with a lithium metal anode, the gravimetric energy density of the battery system improves significantly. When lithium-sulfur and lithium-air batteries are commercialized in the future, it is expected that such a LiM anode and conversion based cathode suggest a hopeful way in overcoming a need for high energy density.

Although such a lithium-sulfur battery using LiM as an anode has some advantages, there are problems in commercialization thereof. First, sulfur has a low electric/ionic-conductivity ($5 \times 10^{-30}$ Scm$^{-1}$, room temperature) and the product thereof, Li$_2$S, also is an insulator. In addition, sulfur has a volume increased by about 80% upon a completely discharged state. The final reaction product, Li$_2$S, forms intermediate species called lithium polysulfides (LiPS, Li$_2$Sn, 2<n<8). LiPS are dissolved into an organic electrolyte to cause the problems of loss of an active material and degradation of the electrodes. When LiPS is present in the electrolyte, it moves through the pores of a separator via concentration gradient and arrives at a lithium anode, thereby forming an internal shuttling pathways between the lithium anode and a sulfur cathode. Such a phenomenon is well known as LiPS shuttling. During shuttling, dissolved LiPS, particular LiPS having a high n value, is reduced on the lithium surface and thus passivates the anode surface, resulting in a rapid decrease in capacity, Coulombic efficiency, and the cycle life of the Li—S battery. Although, it is known that LiNO$_3$ additive is effective for increasing LiM. However, it does not provide a perfect solution to protect highly reactive and electrochemically unstable lithium metal anode.

Another attempt is made by ensuring reversibility of electrodeposition of lithium during charging/discharging. Highly reactive and non-uniform electrodeposition of lithium causes problems, such as thermal runaway, decomposition of electrolyte and loss of lithium. Non-uniform electrodeposition of lithium ions that occurs during charging causes formation of Li dendrites that pierce through a separator. Such a short-circuit causes a thermal runaway, leading to a severe safety issue of catching a fire by ignition of the electrolyte. Another problem of LiM batteries includes side reactions of electrolyte and instability of Coulomb efficiency, which makes the battery system inefficient. Such instability occurs due to a continuous reaction among Li, active species, and electrolyte. Thus, solid-electrolyte interphase (SEI) is continuously regenerated, and the electrodes are passivated during repeated charge/discharge cycles. Such an undesired side reactions pile up inactive species at the electrode/electrolyte interfaces in the battery system, resulting in deterioration of the performance of the battery. Therefore, it is necessary to form stable SEIs and to electrochemically and physically protect the lithium surface.

Although the initial researchers have tried to improve the performance of the battery via several means, such as mechanical ball milling of sulfur and carbon or surface coating using carbon, there was no significant effect. To solve the problem of limitation in electrochemical reaction caused by electroconductivity, it is required to reduce the particle size to a size of several tens of nanometers or less or to carry out surface treatment with a conductive materials.

For this purpose, there have been suggested several physical methods (melt impregnation into nano-sized porous carbon nanostructure or metal oxide structure), mechanical method (high-energy ball milling), or the like.

In addition, there is a method of forming a coating layer on the surface of cathode particles to prevent dissolution of LiPS or adding a porous material capable of capturing dissolved LiPS. Typically, there have been suggested a method of coating the surface of a cathode structure containing sulfur particles with a conductive polymer, a method of coating the surface of a cathode structure with a lithium ion conductive metal oxide, a method of adding a porous metal oxide having a large specific surface area and large pores and capable of absorbing a large amount of LiPS to a cathode, a method of attaching a functional group capable of adsorbing LiPS to the surface of a carbon structure, or a method of surrounding sulfur particles by using graphene oxide or the like.

Further, a multi-functional separator using carbon and a metal oxide has been applied recently to solve the above-mentioned problem of a lithium-sulfur battery. The use of such a separator using the coating, known as a upper current collector, intercepts LiPS so that it reutilize the active species during charge/discharge cycles, thereby providing improved cycling performance. In addition, the self-discharge property and Coulomb efficiency of a lithium-sulfur batter are improved. However, coating on a separator causes an additional increase in weight of a battery, resulting in a decrease in amount of a cathode material. Thus, it is important to select an adequate coating technology and a proper coating material.

REFERENCES

[Patent Document]
Korean Patent Publication No. 10-2015-0045361
Korean Patent Publication No. 10-2015-0078434

SUMMARY

An embodiment of the present disclosure is directed to providing a polyethyleneimine-attached carbonaceous material for coating a separator for a secondary battery which adsorbs and reutilize lithium polysulfides (LiPS) to inhibit a shuttling reaction between an anode and a cathode, caused by dissolution of electrolyte, and increases recyclability of lithium polysulfides, and thus can improve cycle life and rate characteristics of a battery.

Another embodiment of the present disclosure is directed to introducing the aforementioned separator to a secondary battery, particularly a lithium-sulfur battery, and applying the same to energy storage devices included in various electronic/electric appliances to ensure global competitiveness of electrochemical capacitor industry.

In one aspect, there is provided a polyethyleneimine-attached carbonaceous material for coating a separator for a secondary battery.

According to an embodiment, the polyethyleneimine may be any one selected from linear, branched and dendrimer-type polyethyleneimines.

According to another embodiment, the polyethyleneimine may be represented by the following Chemical Formula 1:

[Chemical Formula 1]

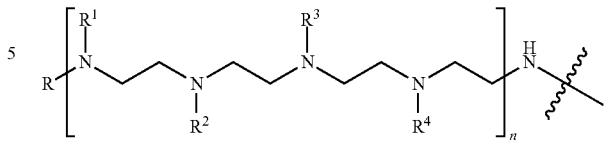

wherein R represents a hydrogen atom, amino group or a C1-C30 alkyl group;

$R^1$-$R^4$ are the same or different, and each independently represents a hydrogen atom or

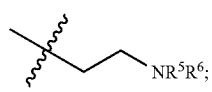

$R^5$ and $R^6$ are the same or different, and each independently represents a hydrogen atom or

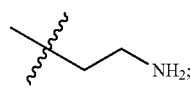

n is a repetition number; and
the average molecular weight is 600-100,000.

According to still another embodiment, the carbonaceous material may be at least one selected from reduced graphene oxide (rGO), graphene oxide (GO), nitrogen (and/or) phosphorus-doped graphene, carbon nanotubes, ketjen black, carbon black, Super-P and graphite.

In another aspect, there is provided a method for preparing a carbonaceous material for coating a separator for a secondary battery, the method including the step of:

(a) dispersing carbonaceous material powder into a solvent to provide a dispersion; and (b) adding polyethyleneimine to the dispersion and carrying out reaction to obtain a polyethyleneimine-attached carbonaceous material.

According to an embodiment, the carbonaceous material powder may be at least one selected from reduced graphene oxide (rGO), graphene oxide (GO), nitrogen (and/or) phosphorus-doped graphene, carbon nanotubes, ketjen black, carbon black, Super-P and graphite.

According to another embodiment, the solvent may be any one selected from water, dimethyl formamide and dimethyl sulfoxide.

According to still another embodiment, the polyethyleneimine may be any one selected from linear, branched and dendrimer-type polyethyleneimines.

According to still another embodiment, the polyethyleneimine in step (b) may be represented by the following Chemical Formula 2:

[Chemical Formula 2]

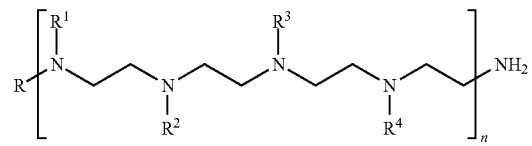

wherein R represents a hydrogen atom, amino group or a C1-C30 alkyl group;

$R^1$-$R^4$ are the same or different, and each independently represents a hydrogen atom or

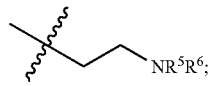

$R^5$ and $R^6$ are the same or different, and each independently represents a hydrogen atom or

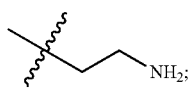

n is a repetition number; and the average molecular weight is 600-100,000.

According to still another embodiment, in step (b), the polyethyleneimine may be added in an amount of 50-300 parts by weight based on 100 parts by weight of the carbonaceous powder dispersed in the dispersion.

According to still another embodiment, the method may further include a step of (c) washing the polyethyleneimine-attached carbonaceous material, after step (b).

In still another aspect, there is provided a separator for a secondary battery, including:

a separator; and a coating layer applied on the separator and including the polyethyleneimine-attached carbonaceous material.

According to an embodiment, the separator for a secondary battery may further include a buffer layer which imparts adhesion force between the separator and the coating layer.

According to another embodiment, the separator may include any one selected from polyethylene polymers, polypropylene polymers, non-woven webs, glass fibers and paper filters.

According to still another embodiment, the buffer layer may include at least one selected from carbon nanotubes and carbon nanofibers.

According to still another embodiment, the coating layer may have a thickness of 0.5-50 µm.

According to still another embodiment, the buffer layer may have a thickness of 50-5000 nm.

In still another aspect, there is provided a method for manufacturing a separator for a secondary battery, which includes coating a separator with the carbonaceous material for coating a separator for a secondary battery obtained by the above method.

According to an embodiment, the method for manufacturing a separator for a secondary battery includes the steps of: (1) forming a buffer layer imparting adhesion force onto a separator to obtain a separator coated with the buffer layer; (2) dispersing the carbonaceous material for coating a separator for a secondary battery obtained by the above method into a solvent to provide a coating solution; and (3) applying the coating solution onto the buffer layer of the separator coated with the buffer layer to form a coating layer.

According to another embodiment, the solvent may be an alcohol solvent.

According to still another embodiment, the coating solution may include the carbonaceous material at a concentration of 1-30 mg/mL.

In still another aspect, there is provided a secondary battery including the separator for a secondary battery.

According to an embodiment, the secondary battery may be any one selected from lithium-sulfur batteries, lithium-air batteries, lithium ion batteries, magnesium ion batteries, sodium ion batteries, potassium ion batteries and aluminum ion batteries.

In yet another aspect, there is provided a device including the secondary battery and selected from portable electronic instruments, mobile units, electric power supplying instruments and energy storage devices.

The carbonaceous material for coating a separator for a secondary battery adsorbs lithium polysulfides (LiPS) to inhibit a shuttling reaction between an anode and a cathode, caused by the dissolution of lithium polysulfides in electrolyte, and increases recyclability of lithium polysulfides, resulting in improvement of life characteristics and rate characteristics of a battery.

In addition, it is possible to ensure global competitiveness of electrochemical capacitor industry by introducing the separator coated with the carbonaceous material for coating a separator for a secondary battery to a secondary battery, particularly a lithium-sulfur battery, and applying the same to energy storage devices included in various electronic/electric appliances.

DETAILED DESCRIPTION OF EMBODIMENTS

Figure 1:
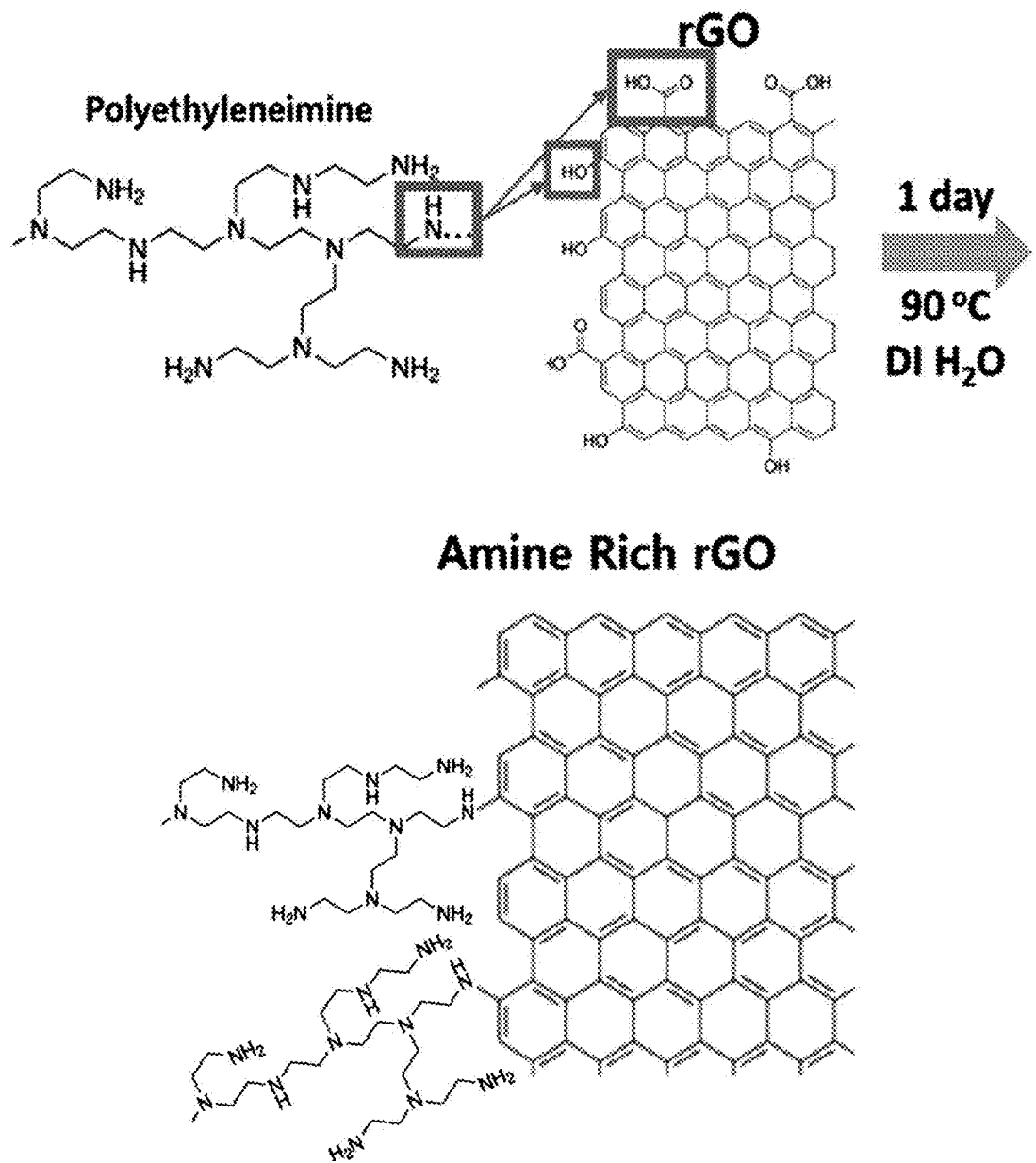
FIG. 1 shows a schematic structure of the polyethyleneimine-attached reduced graphene oxide (PEIrGO) obtained according to Example 1.

Hereinafter, various aspects and embodiments of the present disclosure will be explained in more detail.

Exemplary embodiments now will be described more fully hereinafter with reference to the accompanying drawings, in which exemplary embodiments are shown.

The present disclosure may, however, be embodied in many different forms and should not be construed as limited to the exemplary embodiments set forth therein. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the carbonaceous material for coating a separator for a secondary battery according to an embodiment will be explained in detail.

In one aspect, there is provided a polyethyleneimine-attached carbonaceous material for coating a separator for a secondary battery.

The polyethyleneimine applied to the present disclosure covers not only polyethyleneimine but also derivatives thereof.

Particularly, the polyethyleneimine is any one selected from linear, branched and dendrimer-type polyethyleneimines, and more particularly, a branched polyethyleneimine.

The polyethyleneimine may be represented by the following Chemical Formula 1:

[Chemical Formula 1]

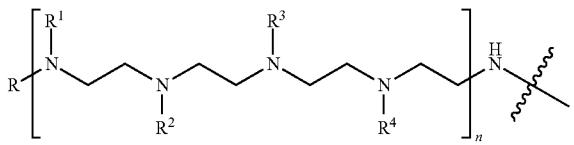

wherein R represents a hydrogen atom, amino group or a C1-C30 alkyl group;

$R^1$-$R^4$ are the same or different, and each independently represents a hydrogen atom or

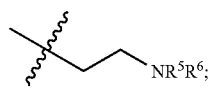

$R^5$ and $R^6$ are the same or different, and each independently represents a hydrogen atom or

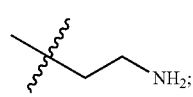

n is a repetition number; and
the average molecular weight is 600-100,000.

The carbonaceous material may be reduced graphene oxide (rGO), graphene oxide (GO), nitrogen (and/or) phosphorus-doped graphene, carbon nanotubes, Ketjen black, carbon black, Super-P, graphite, or the like, but is not limited thereto.

Hereinafter, the method for preparing a carbonaceous material for coating a separator for a secondary battery according to the present disclosure will be explained.

First, carbonaceous material powder is dispersed into a solvent to provide a dispersion (step a).

The carbonaceous material may be reduced graphene oxide (rGO), graphene oxide (GO), nitrogen (and/or) phosphorus-doped graphene, carbon nanotubes, Ketjen black, carbon black, Super-P, graphite, or the like, but is not limited thereto.

The solvent may be water, dimethyl formamide, dimethyl sulfoxide, or the like.

Particularly, the polyethyleneimine is any one selected from linear, branched and dendrimer-type polyethyleneimines, and more particularly, a branched polyethyleneimine.

The polyethyleneimine may be represented by the following Chemical Formula 2:

[Chemical Formula 2]

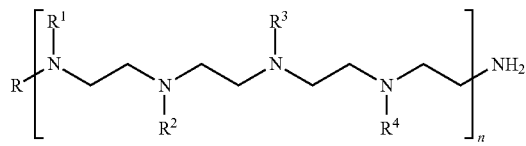

wherein R represents a hydrogen atom, amino group or a C1-C30 alkyl group;

$R^1$-$R^4$ are the same or different, and each independently represents a hydrogen atom or

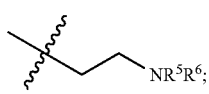

$R^5$ and $R^6$ are the same or different, and each independently represents a hydrogen atom or

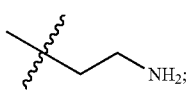

n is a repetition number; and
the average molecular weight is 600-100,000.

Next, polyethyleneimine is added to the dispersion and reaction is carried out to obtain a polyethyleneimine-attached carbonaceous material (step b).

The polyethyleneimine is added particularly in an amount of 50-300 parts by weight, more particularly 100-150 parts by weight, based on 100 parts by weight of the carbonaceous powder dispersed in the dispersion.

Then, the polyethyleneimine-attached carbonaceous material is washed (step c).

Hereinafter, the separator for a secondary battery according to the present disclosure will be explained.

The separator for a secondary battery includes:
a separator; and
a coating layer applied on the separator and including the polyethyleneimine-attached carbonaceous material.

The separator for a secondary battery may further include a buffer layer which imparts adhesion force between the separator and the coating layer.

The buffer layer may include carbon nanotubes or carbon nanofibers, but is not limited thereto.

The separator may include a polyethylene polymer, polypropylene polymer, non-woven web, glass fibers, paper filter, or the like, but is not limited thereto.

The coating layer may have a thickness of 0.5-50 μm, particularly 5-10 μm.

The buffer layer may have a thickness of 50-5000 nm, particularly 500-2000 nm.

Hereinafter, the method for manufacturing a separator for a secondary battery according to the present disclosure will be explained.

The separator for a secondary battery may be manufactured by coating a separator with the carbonaceous material for coating a separator for a secondary battery obtained by the above-described method.

Particularly, a buffer layer imparting adhesion force to a separator is formed on a separator to provide a separator coated with the buffer layer (step 1).

The separator may include a polyethylene polymer, polypropylene polymer, non-woven web, glass fibers, paper filter, or the like.

The buffer layer may be formed of carbon nanotubes or carbon nanofibers.

The carbon nanotubes or carbon nanofibers forming the buffer layer may be dispersed into a solvent to form a coating solution, which is subjected to various coating processes to form a buffer layer.

The coating processes may include dip coating, spin coating, spray coating, or the like, but are not limited thereto.

The buffer layer may have a thickness of 50-5000 nm, particularly 500-2000 nm.

Next, the carbonaceous material for coating a separator for a secondary battery obtained by the above-described method is dispersed into a solvent to provide a coating solution (step 2).

Particularly, the solvent is an alcohol solvent.

The carbonaceous material coating solution may include the carbonaceous material in an amount of 1-30 mg/mL, particularly 1-10 mg/mL, in the solvent.

Then, the coating solution is applied onto the buffer layer of the separator coated with the buffer layer to form a coating layer including the polyethyleneimine-attached carbonaceous material (step 3).

The coating solution may be applied through dip coating, spin coating, spray coating, or the like, but is not limited thereto.

The coating layer may have a thickness of 0.5-50 μm, particularly 5-10 μm.

In another aspect, there is provided a secondary battery including the separator for a secondary battery.

The secondary battery may be any one selected from lithium-sulfur batteries, lithium-air batteries, lithium ion batteries, magnesium ion batteries, sodium ion batteries, potassium ion batteries and aluminum ion batteries.

In still another aspect, there is provided a device including the secondary battery and selected from portable electronic instruments, mobile units, electric power supplying instruments and energy storage devices.

The examples and experiments will now be described. The following examples and experiments are for illustrative purposes only and not intended to limit the scope of this disclosure.

EXAMPLES

Example 1: Preparation of Polyethyleneimine-Attached Reduced Graphene Oxide (PEIrGO)

A piece of graphite was dispersed in concentrated sulfuric acid and cooled to 0° C., and then potassium permanganate solution was added dropwise thereto in an amount of 5 g so that the temperature may not exceed 10° C. The resultant solution was filtered several times with deionized water to obtain graphene oxide. The graphene oxide powder was treated in a tubular furnace at 800° C. for 120 minutes while introducing hydrogen gas thereto at 100 sccm, and cooled naturally to room temperature to obtain reduced graphene oxide. The reduced graphene oxide was dispersed thoroughly in water and a PEI attachment process was carried out. After 300 mg of reduced graphene oxide was introduced to 500 mL of distilled water, it was dispersed thoroughly under ultrasonication for 30 minutes. Next, 0.5 g of branched polyethyleneimine (average Mx: about 25,000 (LS), average Mn: about 10,000 (GPC), branched) was added thereto. The resultant solution was maintained at 90° C. for 24 hours under agitation in an oil thermostat, cooled to room temperature, subjected to centrifugal separation 10 times with deionized water, and then washed. FIG. 1 shows a schematic structure of PEIrGO including polyethyleneimine attached to rGO and enriched with amine groups according to Example 1.

Figure 2:
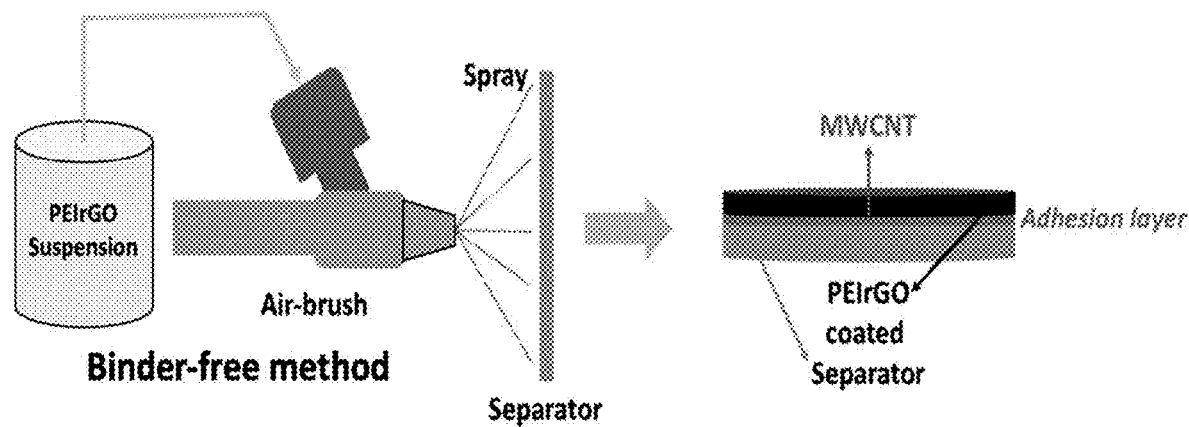
FIG. 2 is a schematic view of the process according to Example 2.

Example 2: Manufacture of Separator Coated with Layer Including Polyethyleneimine-Attached Carbonaceous Material PEIrGO obtained from Example 1 was dispersed in ethanol solution at a concentration of about 2 mg/mL and ultrasonic dispersion was carried out for 30 minutes to prepare a coating solution. The resultant coating solution was applied onto Celgard 2500 separator coated with multi-walled carbon nanotubes to a thickness of about 1500 nm by using an air sprayer so that the coating thickness may be about 7-8 μm. The coated separator was introduced to a dryer maintained at 60° C. and retained for about 12 hours to remove water. FIG. 2 is a schematic view of the process according to Example 2.

Lithium Metal Coating

Lithium metal foil as an anode was used as it is for comparison. Otherwise, used was a lithium anode obtained by coating aluminum foil with lithium-terminated sulfonated titania nanoparticles with a thickness of about 1 μm by using Langmuir-Blodgett scooping (LBS) process and transferring the coated aluminum to lithium metal through a roll press process.

TEST EXAMPLES

Test Method

To investigate the electrochemical characteristics of a lithium-sulfur battery using a separator coated with PEIrGO, a sulfur electrode was used as a cathode to carry out a test.

Lithium metal or modified lithium metal was used as an anode and the following two types of different electrolytes were used: 1) 1 M LiTFSI 0.05 M LiNO$_3$ DME (dimethoxyethane):DOL (dioxolane)(1:1 v:v), and 2) 1 M LiTFSI DME:DOL (1:1 v:v). Celgard 2500 separator and 0.3 mL of electrolyte were used and a coin cell was assembled and tested under a charging/discharging condition of 0.5 C-3 C.

To measure AC impedance, a frequency range of 1 MHz-0.1 Hz was selected and lithium metal or modified lithium metal, Celgard 2500 separator, PEIrGO-coated Celgard 2500 separator, and 1 M LiTFSI DME:DOL (1:1 v:v) as electrolyte were used to assemble a lithium-sulfur cell, which was determined before electrochemical cycles.

Figure 3:
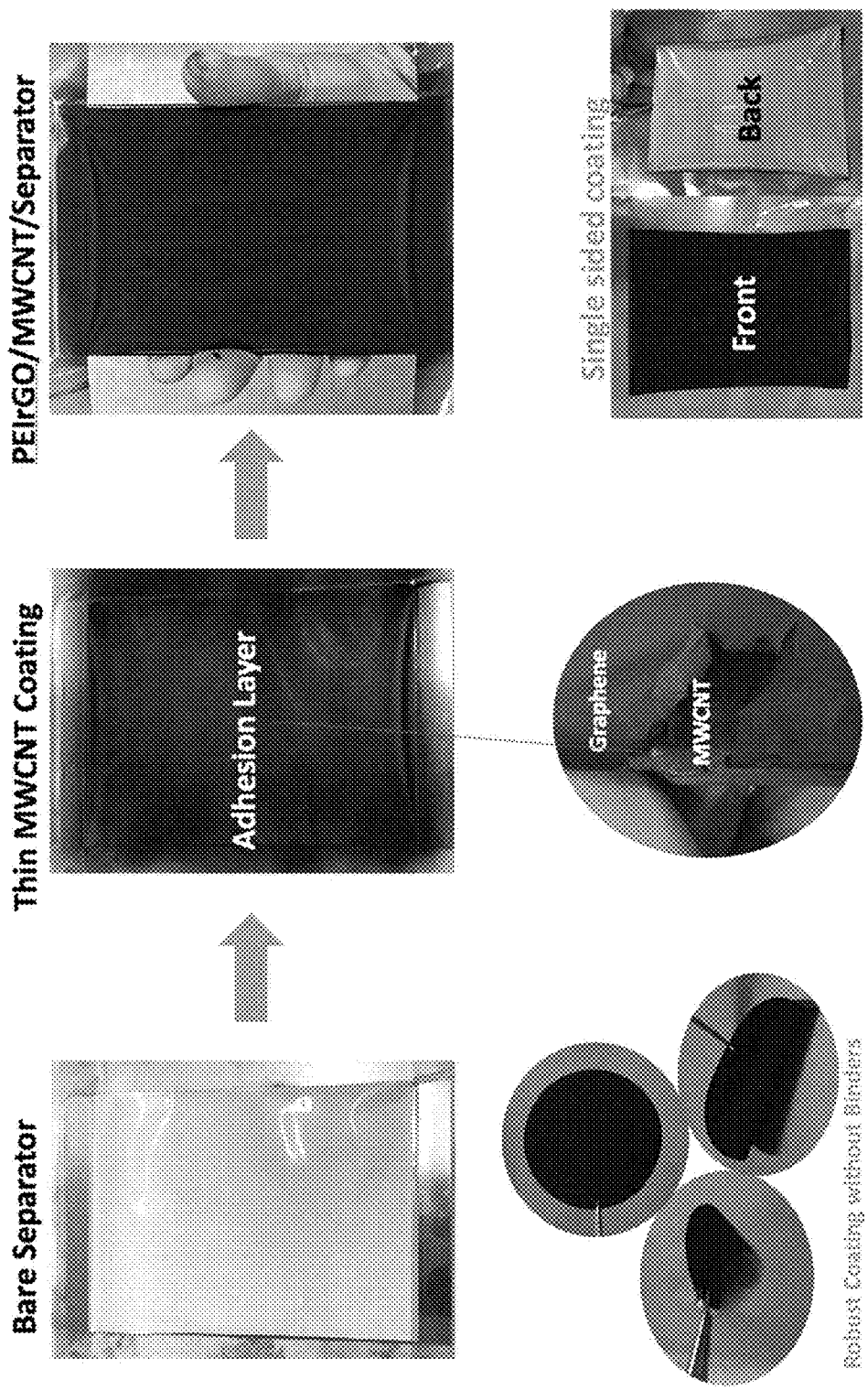
FIG. 3 shows a photographic image illustrating the flow chart of the method for manufacturing a separator coated with a coating layer including the polyethyleneimine-attached carbonaceous material according to Example 2.

Test Example 1: Determination of Separator Coated with Coating Layer Including Polyethyleneimine-Attached Carbonaceous Material FIG. 3 shows a photographic image illustrating the flow chart of a method for manufacturing a separator coated with a coating layer including the polyethyleneimine-attached carbonaceous material according to Example 2. According to FIG. 3, multi-walled carbon nanotubes were applied to the surface of a polypropylene separator to a small thickness to form a buffer layer functioning as an adhesive and dried, and then PEIrGO dispersion was applied thereto and dried to obtain a PEIrGO-coated separator. It is shown that the coating layer has excellent adhesion without any adhesive.

Test Example 2: X-Ray Photoelectron Microscopy (XPS) Analysis

Figure 4:
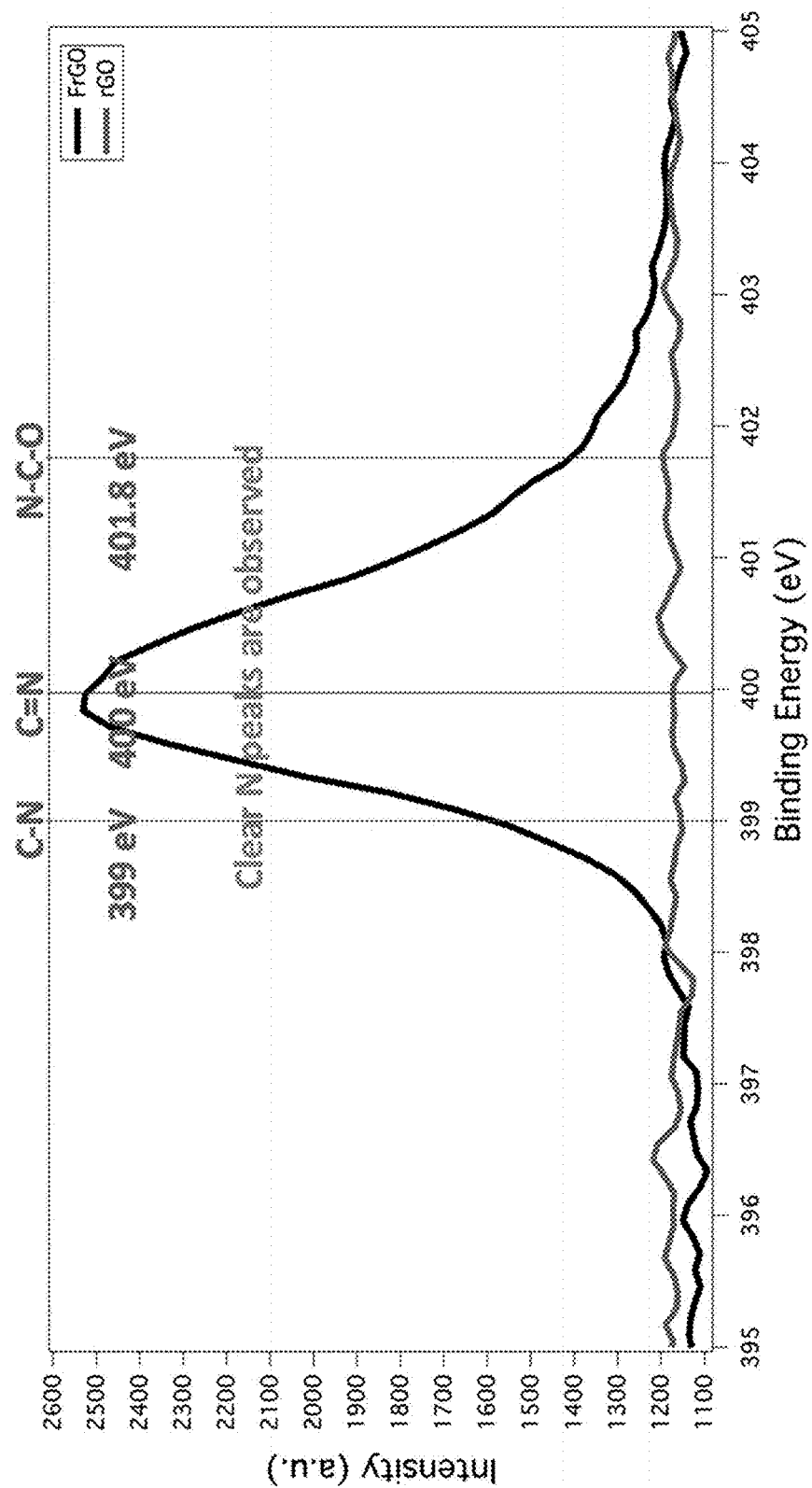
FIG. 4 shows the results of X-ray photoelectron spectroscopy (XPS) for the coating layer including the polyethyleneimine-attached carbonaceous material formed on the separator according to Example 2.

FIG. 4 shows the results of X-ray photoelectron spectroscopy (XPS) for the coating layer including the polyethyleneimine-attached carbonaceous material formed on the separator according to Example 2. According to FIG. 4, the peaks corresponding to single and double bonds between carbon and nitrogen and carbon-nitrogen-oxygen bonds appear, which suggests that amine groups are present on the surface of the separator.

Test Example 3: Scanning Electron Microscopic (SEM) Image Analysis

Figure 5:
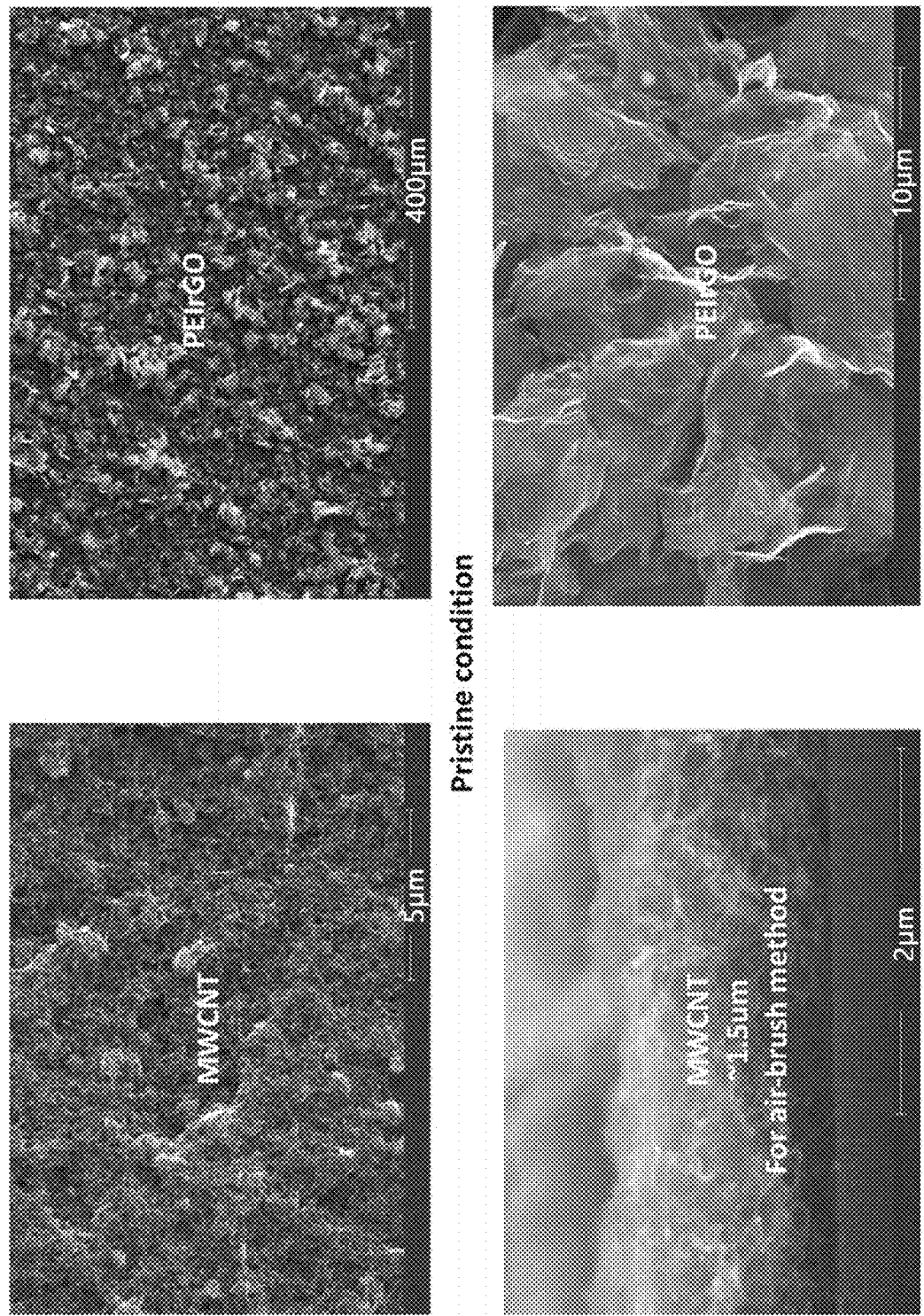
FIG. 5 is a scanning electron microscopic (SEM) image of the separator according to Example 2.

FIG. 5 is a scanning electron microscopic (SEM) image of the separator according to Example 2. FIG. 5 shows the thickness of the MWCNT adhesive layer coated by air spraying and that of the PEIrGO coating layer and whether the coating is carried out sufficiently or not. The MWCNT adhesive layer has a thickness of about 1.5 μm. It can be seen that both the MWCNT adhesive layer and the PEIrGO coating layer were coated uniformly through air spraying.

Test Example 4: Analysis of Impedance of Lithium-Sulfur Battery

Figure 6:
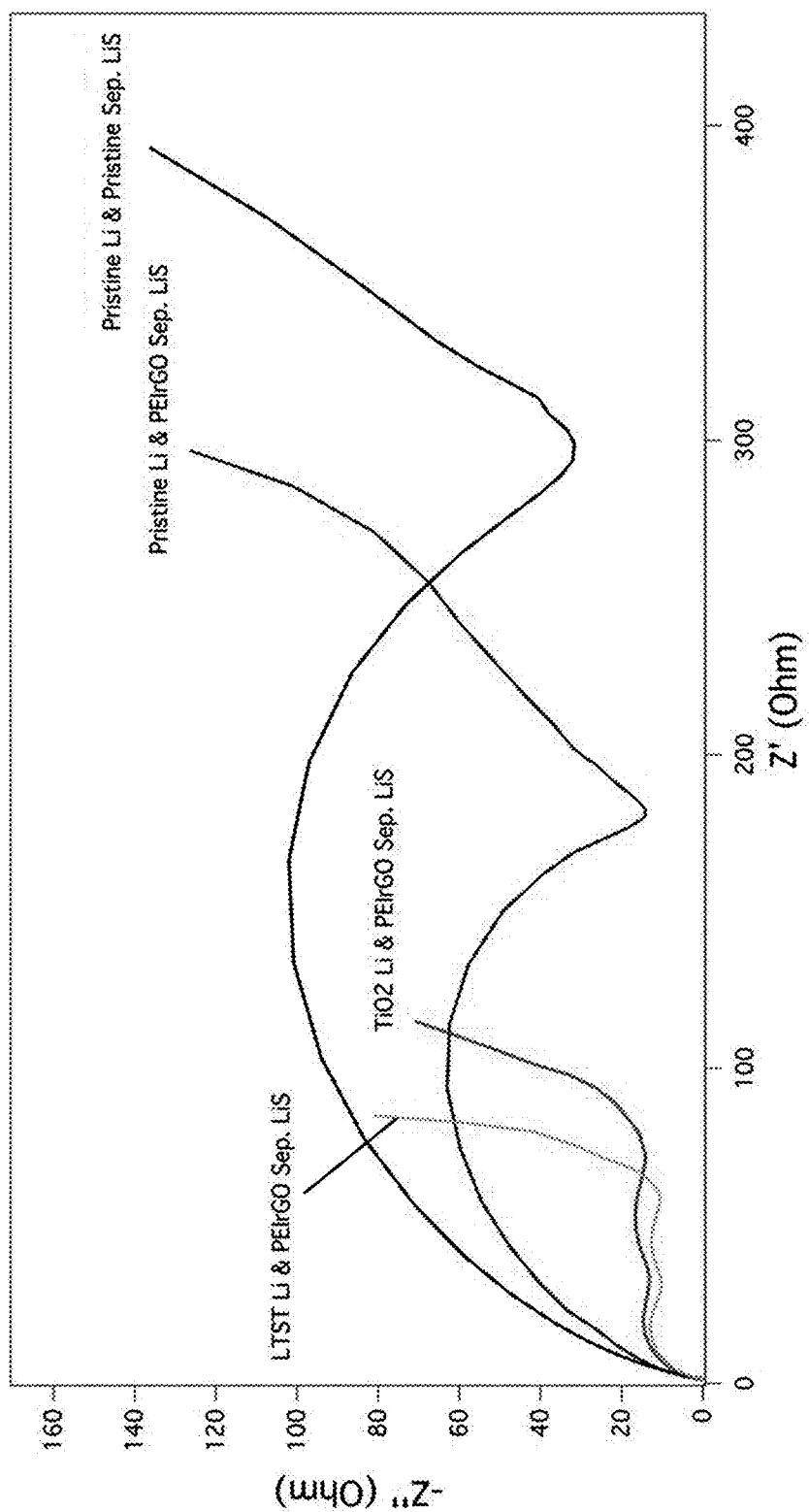
FIG. 6 shows the results of comparative analysis of impedance for the lithium-sulfur batteries according to Test Example 4.

FIG. 6 shows the results of impedance comparison between the lithium-sulfur battery using the separator having a PEIrGO coating layer according to Example 2 and the lithium-sulfur battery using Celgard 2500 separator having no PEIrGO coating layer. According to FIG. 6, the lithium-sulfur battery having the separator coated with multi-walled carbon nanotubes and PEIrGO, a lithium anode and a sulfur cathode shows a decrease in charge transfer resistance from about 300Ω to 180Ω. In the case of a lithium-sulfur battery in which the lithium anode is treated with lithium-terminated sulfonated titania (LTST), charge transfer resistance is decreased to 100Ω or less. This suggests that the separator according to the present disclosure provides improved battery characteristics, particularly rate characteristics.

Test Example 5: Analysis of Cycle Life Characteristics and Coulomb Efficiency

Figure 7:
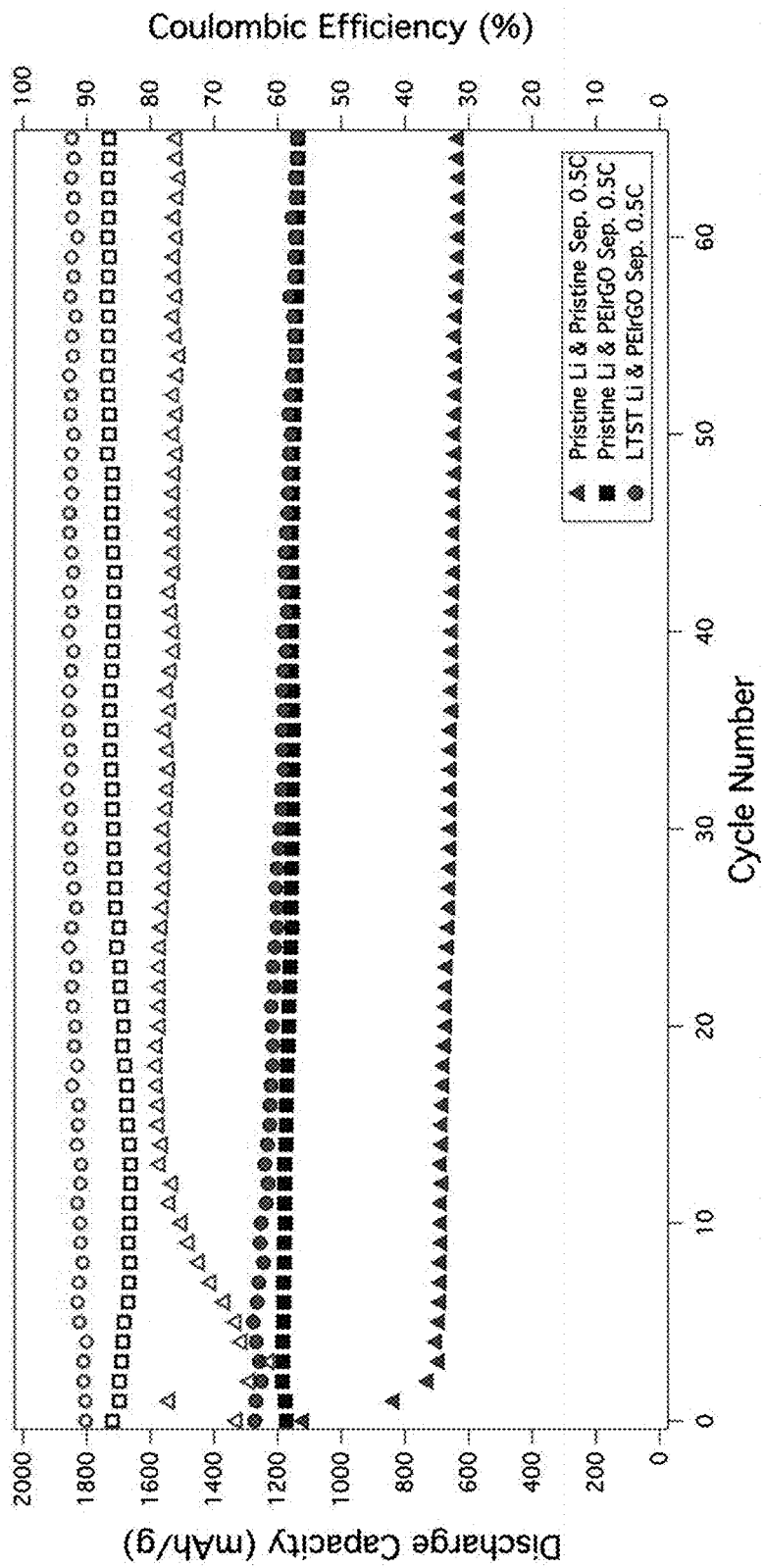
FIG. 7 and FIG. 8 show the results of analysis for cycle life characteristics and Coulomb efficiency according to Test Example 5.

FIG. 7 shows the results of analysis for cycle life characteristics and Coulomb efficiency of the lithium-sulfur battery using the separator having a PEIrGO coating layer according to the present disclosure and the lithium-sulfur battery using the conventional separator and a lithium anode coated with functionalized titania, obtained under a 0.5 C constant-current charging/discharging condition. According to FIG. 7, the lithium-sulfur battery using the conventional lithium metal anode and separator shows a capacity of about 600 mAh/g and a Coulomb efficiency of about 77% at the $60^{th}$ cycle, while the lithium-sulfur battery using a lithium metal anode and PEIrGO-coated separator shows a capacity of about 1170 mAh/g or more and a Coulomb efficiency of 88% or more at the same $60^{th}$ cycle. In addition, the lithium-sulfur battery using a lithium metal anode having a lithium-terminated sulfonated titania (LTST) coating layer and PEIrGO-coated separator shows a capacity of about 1200 mAh/g or more and a Coulomb efficiency of about 92% or more at the same $60^{th}$ cycle.

Figure 8:
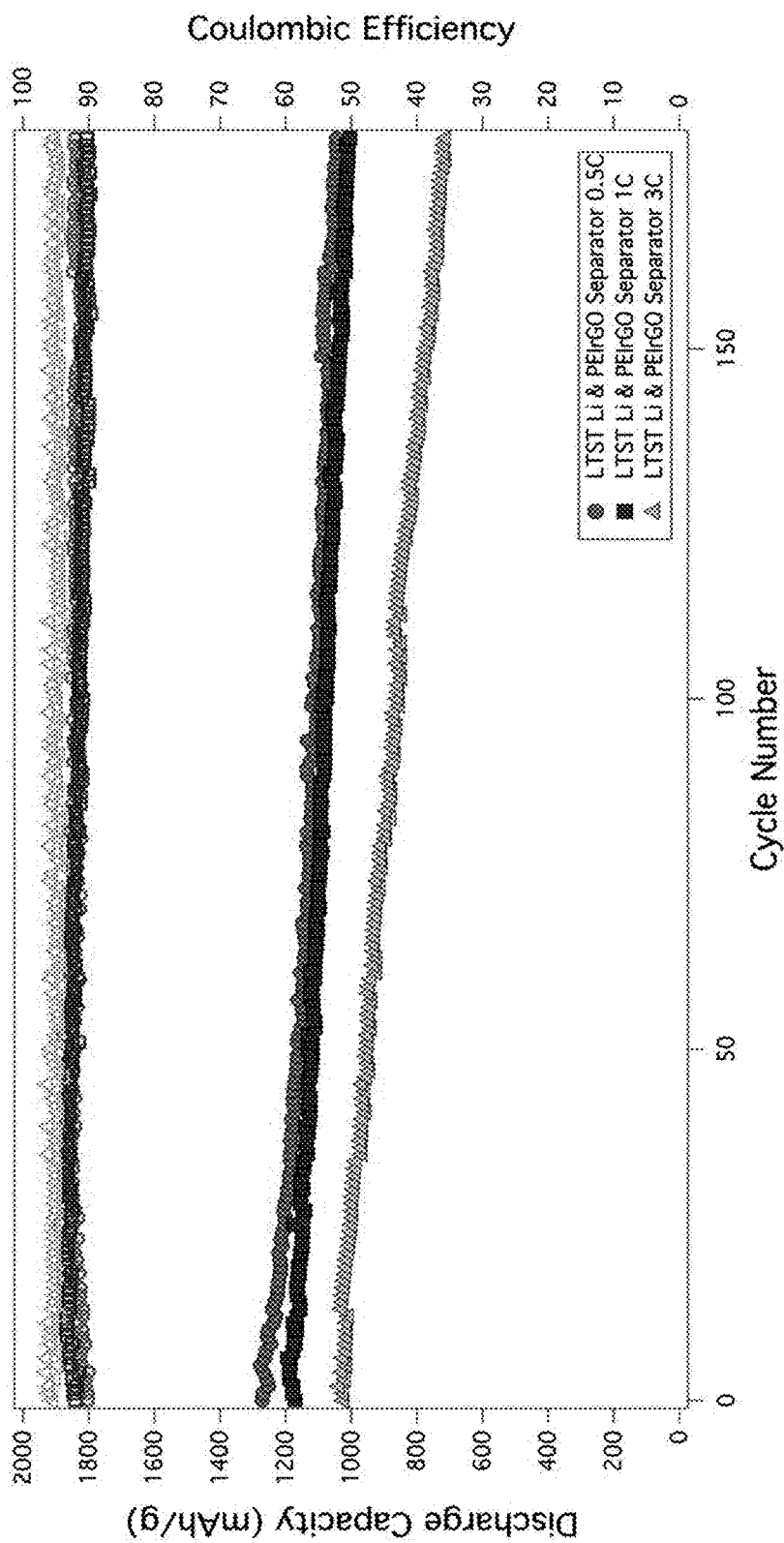

FIG. 8 shows the results of analysis for cycle life characteristics and Coulomb efficiency of the lithium-sulfur battery using a lithium metal anode having a LTST coating layer and the separator having a PEIrGO coating layer according to the present disclosure, obtained under a 0.5 C-3 C constant-current charging/discharging condition. The lithium-sulfur battery shows a capacity of about 1200 mAh/g or more and a Coulomb efficiency of about 92% or more under 0.5 C at the $150^{th}$ cycle. In addition, the lithium-sulfur battery shows a capacity of about 1150 mAh/g or more and about 800 mAh/g or more and a Coulomb efficiency of about 91% or more and about 95% or more under 1 C and 5 C, respectively, at the $150^{th}$ cycle.

Test Example 6: Test of Rate Characteristics of Lithium-Sulfur Battery

Figure 9:
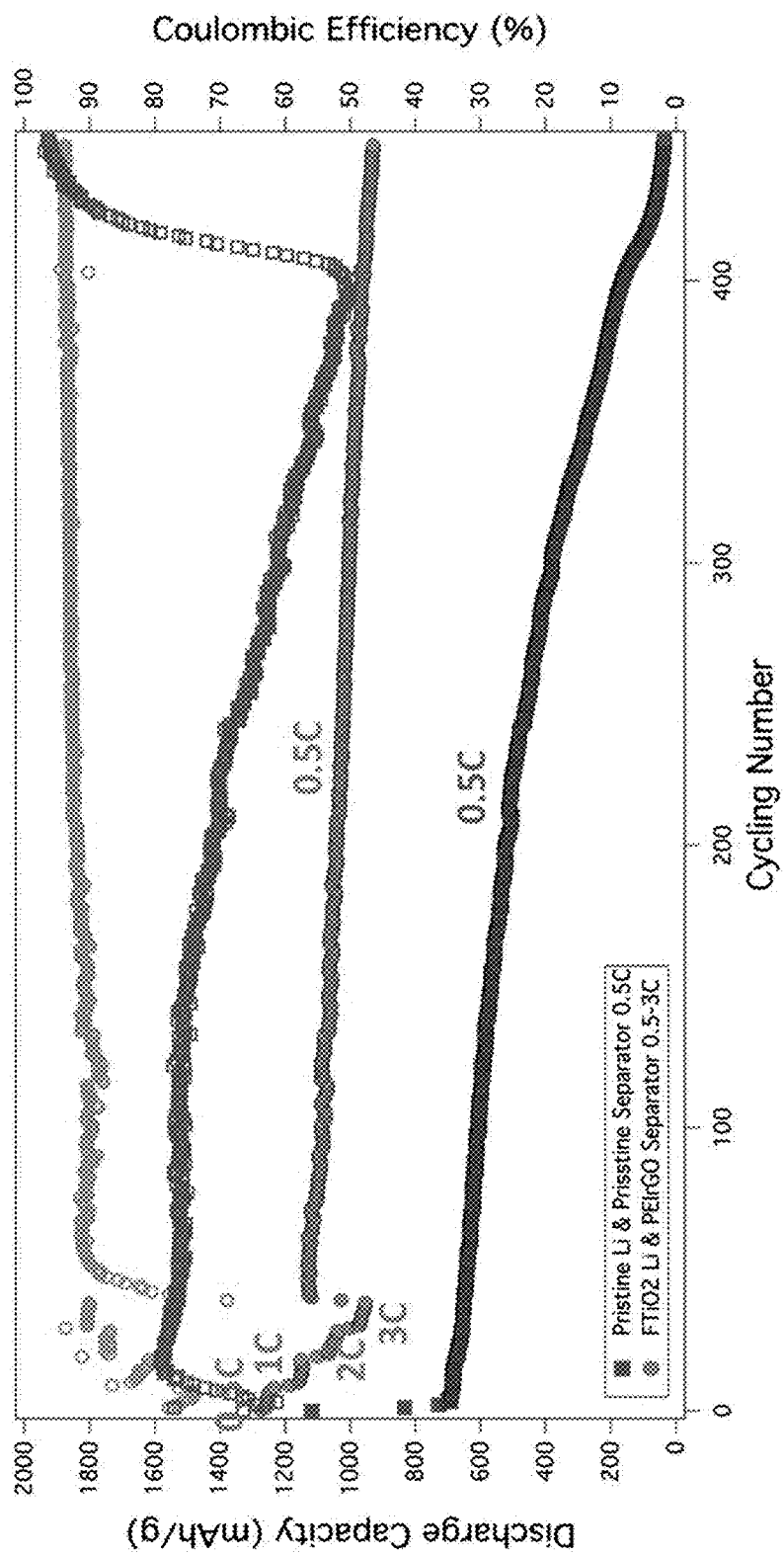
FIG. 9 shows the test results of the rate characteristics of a lithium-sulfur battery according to Test Example 6.

FIG. 9 shows the test results of the rate characteristics of the lithium-sulfur battery including the separator having a PEIrGO coating layer according to Example 2 and lithium metal having a LTST coating layer. The lithium-sulfur battery shows a capacity of 1200 mAh/g at 0.5 C and a capacity of 1100 mAh/g, 1000 mAh/g and 900 mAh/g at 1 C, 2 C and 3 C, respectively. As compared to the initial capacity (1250 mAh/g) at 0.1 C, the above rate characteristics are improved by 96%, 88%, 80% and 72%. It is thought that this is because the cell impedance is reduced according to the present disclosure. On the contrary, the lithium-sulfur battery using a lithium metal anode and the conventional separator stops its performance at the same $450^{th}$ cycle and shows a significant drop in capacity.

Test Example 7: Life Characteristics of PEIrGO Coating Layer on Separator

Figure 10:
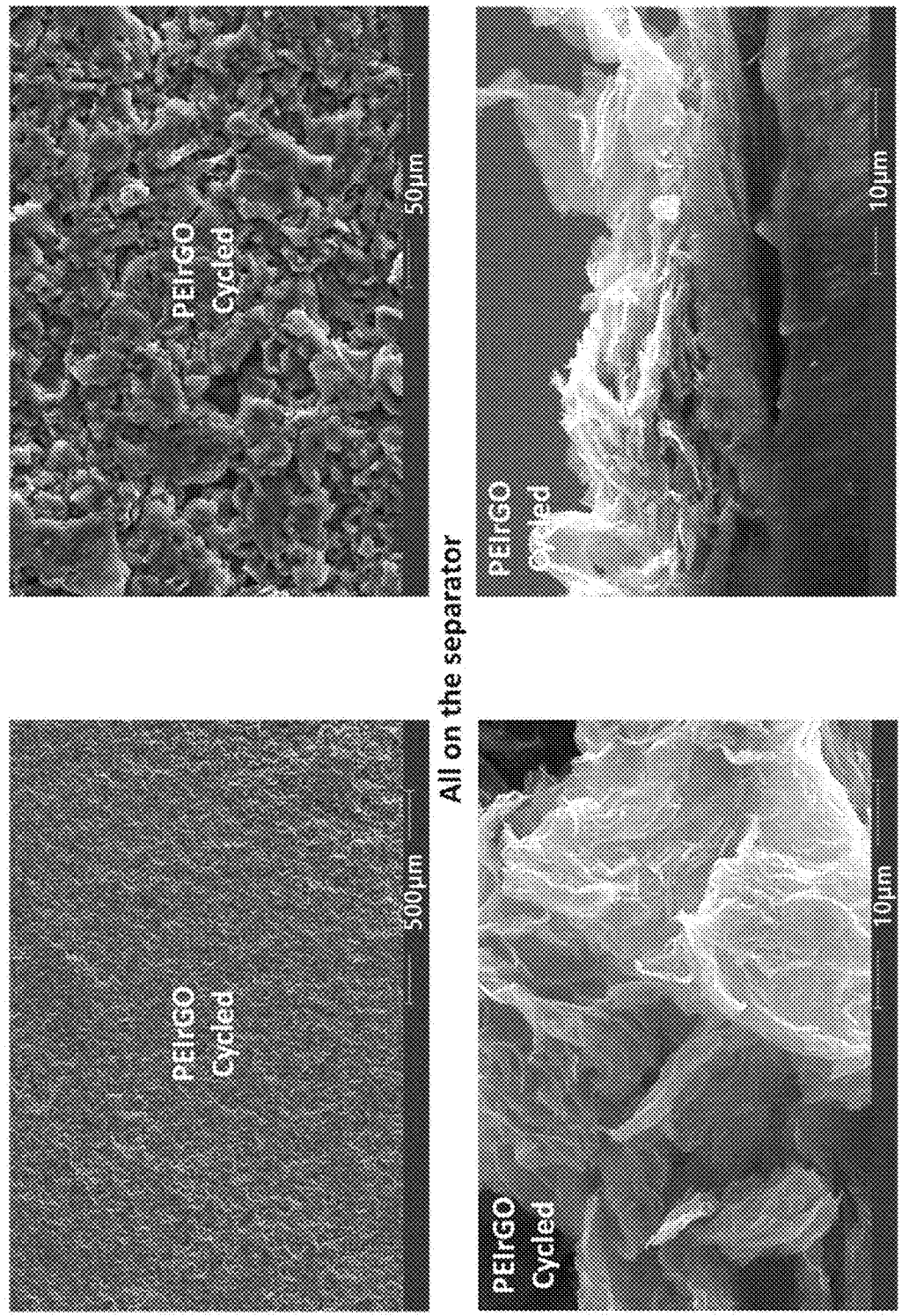
FIG. 10 shows a scanning electron microscopic image illustrating the life characteristics of the separator according to Test Example 7.

FIG. 10 shows a scanning electron microscopic image taken after subjecting the lithium-sulfur battery using the separator having a PEIrGO coating layer according to the present disclosure to 100 cycles. It can be seen that the coating layer on the separator was maintained well without any significant change (left and right sides of the top). It can be seen from the right side image of the bottom that the separator has a coating thickness of about 8 μm and from the left side image of the bottom that graphene retains its shape even after repeating cycles.

Figure 11:
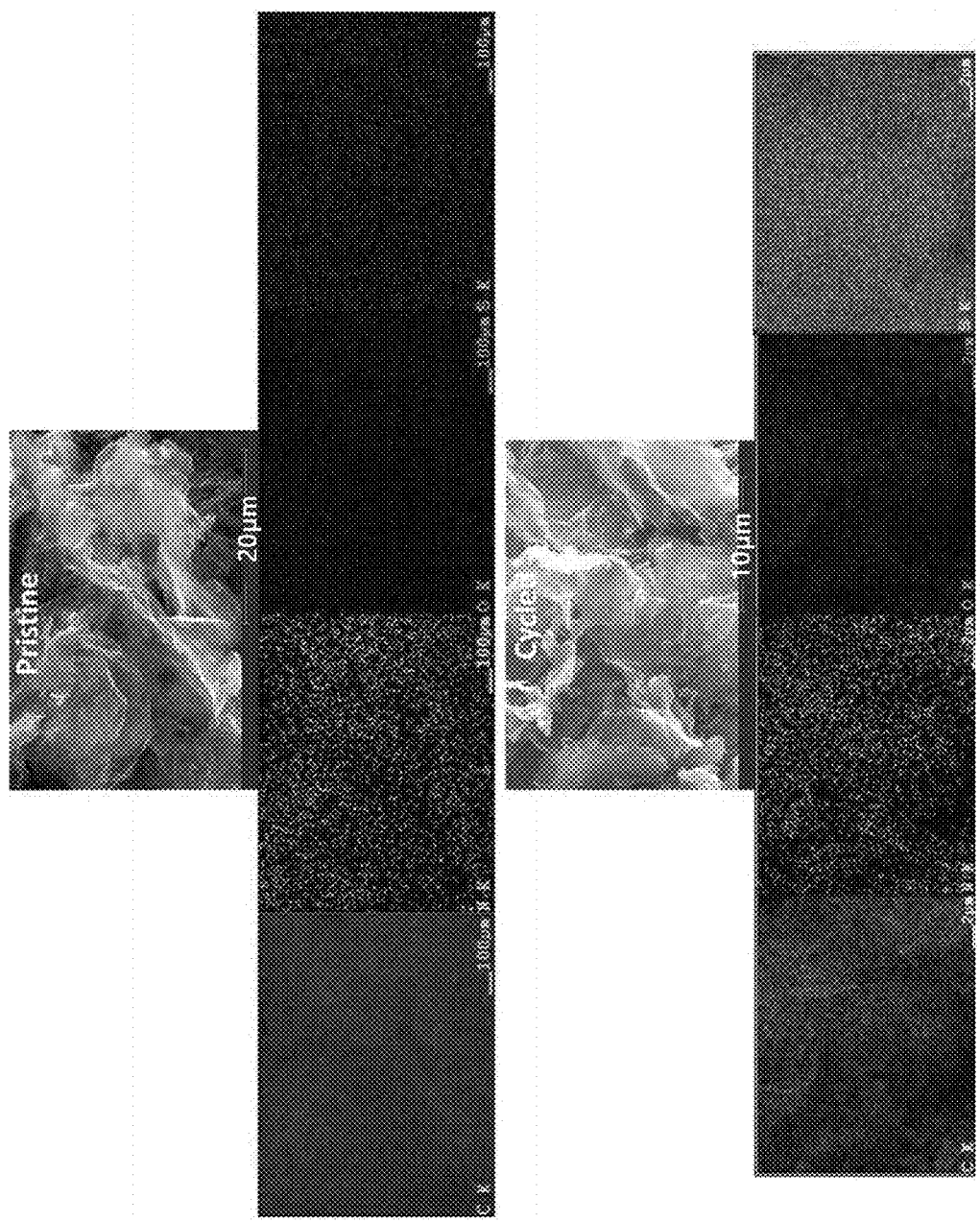
FIG. 11 shows the results of energy dispersive x-ray spectrometry (EDXS) illustrating the life characteristics of the separator according to Test Example 7.

FIG. 11 shows the results of elemental analysis for C, N, O and S based on energy dispersive x-ray spectrometry (EDXS), after the lithium-sulfur battery using the separator having a PEIrGO coating layer according to the present disclosure to 100 cycles. The scanning electron microscopic image at the top shows the graphene coating surface before charge/discharge cycles. Herein, carbon and nitrogen elements derived from graphene and amine groups are detected, while no sulfur element is detected. On the contrary, after 100 cycles, the graphene coating layer shows no significant change but a large amount of sulfur elements are distributed. This suggests that PEIrGO catches LiPS well. It is possible to obtain higher cycle life characteristics and Coulomb efficiency by using such LiPS.

While the present disclosure has been described with respect to the specific embodiments, it will be apparent to those skilled in the art that various changes and modifications may be made without departing from the spirit and scope of the disclosure as defined in the following claims.

What is claimed is:

1. In a secondary battery including a separator, the improvement comprising:
a coating layer that is disposed on the separator and that comprises a polyethyleneimine-attached carbonaceous material,
wherein the polyethyleneimine is represented by Chemical Formula 1 or Chemical Formula 2 below:

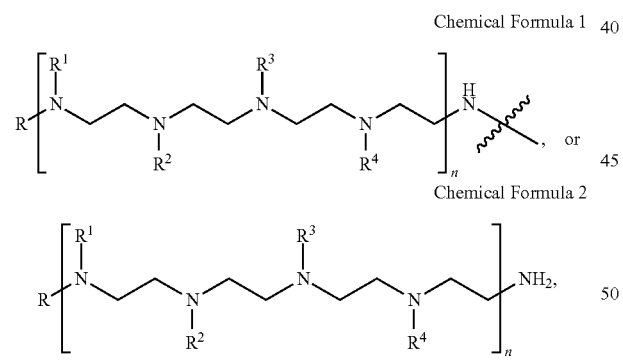

Chemical Formula 1

Chemical Formula 2 where R represents a hydrogen atom, an amino group or a C1-C30 alkyl group;
$R^1$-$R^4$ are the same or different, and each independently represents a hydrogen atom or

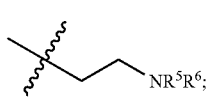

$R^5$ and $R^6$ are the same or different, and each independently represents a hydrogen atom or

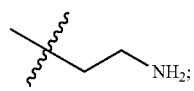

and
n is a repetition number,
wherein the polyethyleneimine has an average molecular weight ranging from 600 to 100,000.

2. The secondary battery according to claim 1, wherein the polyethyleneimine is selected from the group consisting of linear polyethyleneimines, branched polyethyleneimines, and dendrimer-type polyethyleneimines.

3. The secondary battery according to claim 1, wherein the carbonaceous material is selected from the group consisting of reduced graphene oxide (rGO), graphene oxide (GO), nitrogen-doped graphene, phosphorus-doped graphene, carbon nanotubes, ketjen black, carbon black, Super-P, graphite, and combinations thereof.

4. A secondary battery, comprising:
a separator;
a coating layer that is disposed on the separator and that comprises a polyethyleneimine-attached carbonaceous material; and
an adhesive buffer layer provided between the separator and the coating layer which imparts adhesion force between the separator and the coating layer,
wherein the polyethyleneimine is represented by Chemical Formula 1 or Chemical Formula 2 below:

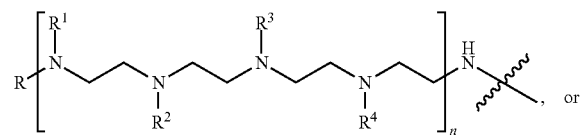

Chemical Formula 1

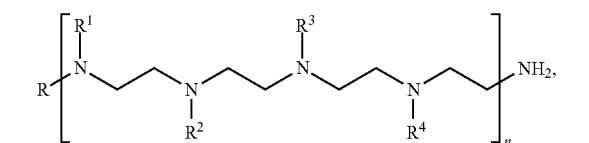

Chemical Formula 2 where R represents a hydrogen atom, an amino group or a C1-C30 alkyl group;
$R^1$-$R^4$ are the same or different, and each independently represents a hydrogen atom or

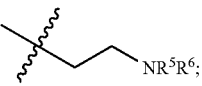

$R^5$ and $R^6$ are the same or different, and each independently represents a hydrogen atom or

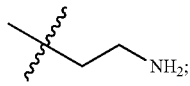

and n is a repetition number, wherein the polyethyleneimine has an average molecular weight ranging from 600 to 100,000.

5. The secondary battery according to claim 4, wherein the separator comprises a material selected from the group consisting of polyethylene polymers, polypropylene polymers, non-woven webs, glass fibers, and paper filters.

6. The secondary battery according to claim 4, wherein the adhesive buffer layer comprises carbon nanotubes, carbon nanofibers, or both carbon nanotubes and carbon nanofibers.

7. The secondary battery according to claim 4, wherein the coating layer has a thickness ranging from 0.5 to 50 μm.

8. The secondary battery according to claim 4, wherein the secondary battery is selected from the group consisting of a lithium-sulfur battery, a lithium-air battery, a lithium ion battery, a magnesium ion battery, a sodium ion battery, a potassium ion battery, and an aluminum ion battery.

9. A device comprising the secondary battery as defined in claim 4 and being selected from the group consisting of portable electronic instruments, mobile units, electric power supplying instruments, and energy storage devices.

10. The secondary battery according to claim 1, wherein the separator comprises a material selected from the group consisting of polyethylene polymers, polypropylene polymers, non-woven webs, glass fibers, and paper filters.

11. The secondary battery according to claim 1, further comprising an adhesive buffer layer provided between the separator and the coating layer which imparts adhesion force there between.

12. The secondary battery according to claim 11, wherein the adhesive buffer layer comprises carbon nanotubes, carbon nanofibers, or both carbon nanotubes and carbon nanofibers.

13. The secondary battery according to claim 1, wherein the coating layer has a thickness ranging from 0.5 to 50 μm.

14. The secondary battery according to claim 4, wherein the polyethyleneimine is selected from the group consisting of a linear polyethyleneimine, a branched polyethyleneimine, and a dendrimer polyethyleneimine.

15. The secondary battery according to claim 4, wherein the carbonaceous material is selected from the group consisting of reduced graphene oxide (rGO), graphene oxide (GO), nitrogen-doped graphene, phosphorus-doped graphene, carbon nanotubes, ketjen black, carbon black, Super-P, graphite, and combinations thereof.

16. A secondary battery, comprising:
a separator;
a coating layer applied on the separator that comprises a polyethyleneimine-attached carbonaceous material in which the polyethyleneimine is selected from the group consisting of a linear polyethyleneimine, a branched polyethyleneimine, and a dendrimer polyethyleneimine, and in which the carbonaceous material is selected from the group consisting of reduced graphene oxide (rGO), graphene oxide (GO), nitrogen-doped graphene, phosphorus-doped graphene, carbon nanotubes, ketjen black, carbon black, Super-P, graphite, and combinations thereof; and
an adhesive buffer layer that is provided between the separator and the coating layer to impart an adhesion force between the separator and the coating layer, and that comprises carbon nanotubes, or carbon nanofibers, or both carbon nanotubes and carbon nanofibers,
wherein the polyethyleneimine is represented by Chemical Formula 1 or Chemical Formula 2 below:

Chemical Formula 1

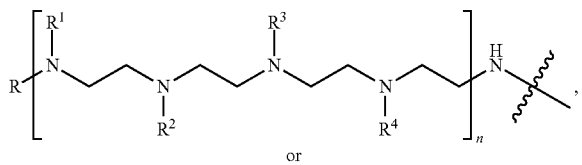

or

Chemical Formula 2

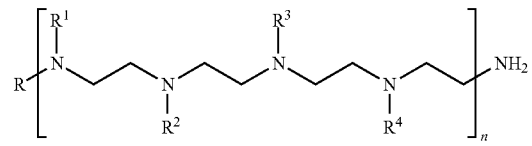

where R represents a hydrogen atom, an amino group or a C1-C30 alkyl group;

$R^1$-$R^4$ are the same or different, and each independently represents a hydrogen atom or

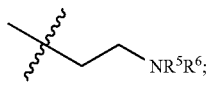

$R^5$ and $R^6$ are the same or different, and each independently represents a hydrogen atom or

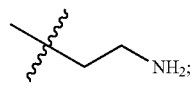

and n is a repetition number, wherein the polyethyleneimine has an average molecular weight ranging from 600 to 100,000.

* * * * *